United States Patent
Inoue

[11] Patent Number: 6,028,594
[45] Date of Patent: Feb. 22, 2000

[54] COORDINATE INPUT DEVICE DEPENDING ON INPUT SPEEDS

[75] Inventor: Kinya Inoue, Fukushima-ken, Japan

[73] Assignee: Alps Electric Co., Ltd., Japan

[21] Appl. No.: 08/868,039

[22] Filed: Jun. 3, 1997

[30] Foreign Application Priority Data

Jun. 4, 1996 [JP] Japan .................................. 8-141788

[51] Int. Cl.⁷ .............................. G09G 5/00; G09G 5/08
[52] U.S. Cl. ........................................ 345/173; 345/159
[58] Field of Search .................................. 345/173, 179, 345/174, 175, 176, 177, 178, 156, 157, 159; 84/600; 356/419; 704/203, 205, 225, 229; 250/226

[56] References Cited

U.S. PATENT DOCUMENTS

| | | | |
|---|---|---|---|
| 4,845,684 | 7/1989 | Garwin et al. ........................ | 345/179 |
| 5,053,757 | 10/1991 | Meadows .............................. | 345/173 |
| 5,305,017 | 4/1994 | Gerpheide ............................ | 345/174 |
| 5,600,105 | 2/1997 | Fukuzaki et al. ..................... | 345/179 |
| 5,663,514 | 9/1997 | Usa ...................................... | 84/600 |
| 5,729,011 | 3/1998 | Sekiguchi ............................. | 250/226 |
| 5,799,270 | 8/1998 | Hasegawa ............................. | 704/205 |

*Primary Examiner*—Steven J. Saras
*Assistant Examiner*—Paul A. Bell
*Attorney, Agent, or Firm*—Brinks Hofer & Gilson & Lione

[57] ABSTRACT

There is provided a coordinate input device in which when a coordinate input object is moved on a tablet while being in contact with the tablet, and this state is displayed with cursor movement, fine movement or delay movement of the cursor does not occur. The coordinate input device is constituted by a tablet operated by a coordinate input object and a coordinate data generation section for generating coordinate data representing a coordinate position on the tablet operated by the coordinate input object, and the coordinate data generation section comprises a moving speed detection section for detecting a contact moving speed of the coordinate input object on the tablet and a fine movement removing filter for removing an unnecessary frequency component included in the coordinate data, so that a cutoff frequency of the fine movement removing filter is switched in accordance with the moving speed detected by the moving speed detection section.

3 Claims, 5 Drawing Sheets

COORDINATE INPUT DEVICE DEPENDING ON INPUT SPEEDS

BACKGROUND OF THE INVENTION

1. Field of the Invention

The present invention relates to a coordinate input device and, more particularly, to a coordinate input device in which when a coordinate input object is brought into contact with an operation area to display a contact state of the operation area with a cursor, the cursor is suppressed from being finely moved in accordance with a moving speed of the coordinate input object.

2. Description of the Related Art

In recent years, a coordinate input device used by the following manner has developed. That is, when a coordinate input object such as an input pen or a finger is brought into contact with a desired position of a tablet-type operation area, coordinate data representing the coordinate positions of the contact portions are sequentially output to display the contact positions of the coordinate input object.

Figure 5:
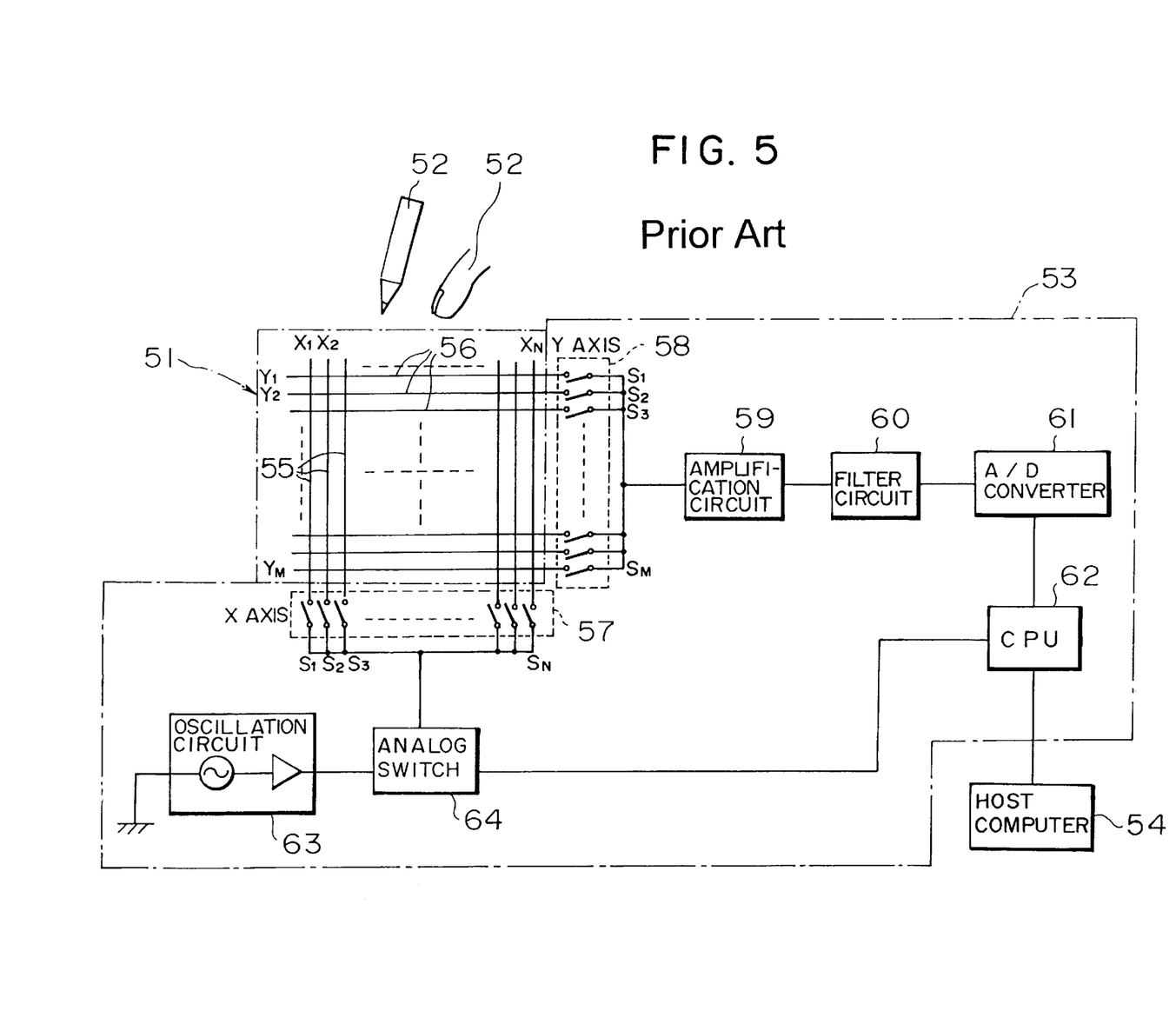
FIG. 5 is a block diagram showing a conventional coordinate input device.

Here, FIG. 5 is a block diagram showing a known coordinate input device.

As shown in FIG. 5, the coordinate input device is constituted by a tablet 51, a coordinate input object 52 such as an input pen or a finger of an operator, a coordinate data generator 53, and a signal processor 54.

The tablet 51 is arranged to be perpendicular to the upper and lower surfaces of a substrate (not shown), and is constituted by a plurality of (N) electrodes 55 ($X_1$ to $X_N$) and a plurality of (M) electrodes 56 ($Y_1$ to $Y_M$) which are arranged in a matrix, a protective film (not shown) adhered to the upper surface of the substrate, and the like. The input pen 52 has a tip and a surface which consist of a conductive material. The coordinate data generator 53 is constituted by an X-axis side multiplexer 57, a Y-axis side multiplexer 58, a first amplification circuit 59, a first filter circuit 60, an analog/digital converter (A/D) 61, a controller (CPU) 62, an oscillation circuit 63, and an analog switch 64. In this case, the X-axis side multiplexer 57 has a plurality of (N) switches $S_1$ to $S_N$ which are arranged in parallel to each other. One ends of the switches $S_1$ to $S_N$ are connected to one ends of the X electrodes 55 ($X_1$ to $X_N$), respectively, and the other ends of the switches $S_1$ to $S_N$ are connected to the analog switch 64 in common. The Y-axis side multiplexer 58 has a plurality of (M) switches $S_1$ to $S_M$ which are arranged in parallel. One ends of the switches $S_1$ to $S_M$ are connected to one ends of the Y electrodes 56 ($Y_1$ to $Y_M$), respectively, and the other ends of the switches $S_1$ to $S_M$ are connected to the input terminal of the first amplification circuit 59 in common. One input terminal of the first filter circuit 60 is connected to the output terminal of the first amplification circuit 59, and the output terminal of the first filter circuit 60 is connected to the input terminal of the A/D 61. The CPU 62 has a data output terminal connected to the signal processor 54, and has a control terminal connected to the control terminal of the analog switch 64. The signal processor 54 is constituted by a known personal computer (PC) or the like, and comprises a liquid-crystal display unit 54a or a CRT display unit.

An operation of a known coordinate input device having the above arrangement will be briefly described below.

A case wherein the tablet 51 is operated with a finger 52 of an operator will be described. An oscillation signal from the oscillation circuit 63 is supplied to the X-axis side multiplexer 57. At this time, the switches $S_1$ to $S_N$ of the X-axis side multiplexer 57 and the switches $S_1$ to $S_M$ of the Y-axis side multiplexer 58 are ON/OFF-controlled with a control signal supplied from the CPU 62. The manner of this control is as follows. That is, the switch $S_1$ of the X-axis side multiplexer 57 is turned on first, and the switches $S_1$ to $S_M$ of the Y-axis side multiplexer 58 are sequentially turned on. The switch $S_2$ of the X-axis side multiplexer 57 is turned on, the switches $S_1$ to $S_M$ of the Y-axis side multiplexer 58 are sequentially turned on. Similarly, with respect to the switches $S_3$ to $S_M$ of the X-axis side multiplexer 57, one of these switches is turned on, and the switches $S_1$ to $S_M$ of the Y-axis side multiplexer 58 are sequentially turned on. With the above scanning operation, oscillation signals from the oscillation circuit 63 are sequentially supplied to the X electrodes 55 ($X_1$ to $X_N$), and the signal voltages of the oscillation signals generate electrostatic capacitors between the X electrodes 55 ($X_1$ to $X_N$) and the Y electrodes 56 ($Y_1$ to $Y_M$).

Here, when the finger 52 is brought into contact with a desired position on the tablet 51, some of electric lines of force generated by a capacitor near the contact position are absorbed by the finger 52, the capacitance of the electrostatic capacitor located at this portion, and the signal voltage extracted from the portion decreases according to a decrease in the capacitance. With the scanning operation of the X-axis side multiplexer 57 and the Y-axis side multiplexer 58, the signal voltages output from the Y electrodes 56 ($Y_1$ to $Y_M$) are amplified by the first amplification circuit 59 as in the case of detection at a Y-axis coordinate position by the operation of the input pen 52, and the signal voltages from which noise components are removed by the first filter circuit 60 are supplied to the A/D 61. The A/D 61 converts the input signal voltages into digital signals, and the CPU 62 loads the digital signals. The CPU 62 calculates the Y and X electrodes 56 and 55 each having the smallest signal voltage value on the basis of the loaded digital signals to detect a contact position of the finger 52 on the tablet 51.

In this manner, when detection for the X- and Y-coordinates of the position where the finger 52 touches on the tablet 51 is made, the CPU 62 sends the detection data to the signal processor 54. In the signal processor 54, the contact position of the finger 52 is displayed on the liquid-crystal display unit 54a by means of movement of the cursor, and selection or the like for a menu corresponding to the contact position of the finger 52 is performed.

When the tablet 51 is operated with the input pen 52, a generated electrostatic capacitance is absorbed by a hand holding the finger 52 through the input pen 52 to detect the X and Y coordinates of the finger 52 as described above.

In the known coordinate input device described above, assume that a coordinate input object such as the finger 52 of the operator is brought into contact with the tablet (operation area) 51 and that the contact position on the tablet 51 is moved. In this case, the moving speed of the coordinate input object on the tablet 51 generally varies, and the range of variation is of several Hz to 10 Hz as a frequency range. In addition, since the tablet 51 used in the known coordinate input device has often high sensitivity, a variation in the moving speed of the coordinate input object on the tablet 51 is detected. As a result, when the moving state of the coordinate input object on the tablet 51 is displayed on the display unit 54a of the signal processor 54, the cursor may finely move or vibrate disadvantageously.

In order to solve the above problem, in some of the known coordinate input devices, when coordinate data is output from the tablet 51, the CPU 62 performs a filter process to the coordinate data by using software, and a signal process is performed to remove fine movement or vibration of the cursor displayed on the liquid-crystal display unit 54a of the signal processor 54.

However, since a frequency component representing fine movement or vibration of the cursor may be approximate to a frequency component representing the moving speed of the coordinate input object on the tablet 51, when the CPU 62 performs a filter process by using software, the frequency component representing the moving speed of the coordinate input object on the tablet 51 is attenuated together with the frequency component representing the fine movement or vibration of the cursor. As a result, another problem that the movement of the cursor corresponding to the moving speed of the coordinate input object on the tablet 51 is delayed is posed.

SUMMARY OF THE INVENTION

The present invention has been made to solve all the above problems, and has as its object to provide a coordinate input device in which when a coordinate input object is moved while being in contact with an operation area, and the state is displayed by cursor movement, fine movement or delay movement of the cursor does not occur.

In order to achieve the above object, a coordinate input device according to the present invention detects a contact moving speed of a coordinate input object on an operation area, and uses the detection result to switch a cutoff frequency of a filter for removing an unnecessary frequency component included in coordinate data, i.e., fine movement or vibration of a cursor.

When it is detected that the moving speed of the coordinate input object on the operation area is high, the cutoff frequency of the filter is shifted to a high-frequency side, and a frequency component which causes fine movement of the cursor is reduced without attenuating a frequency component representing the moving speed of the coordinate input object. On the other hand, when it is detected that the moving speed of the coordinate input object on the operation area is low, the cutoff frequency of the filter is shifted to a low-frequency side, and a frequency component which causes fine movement of the cursor is considerably reduced without attenuating the frequency component representing the moving speed of the coordinate input object in the same manner as described above.

DESCRIPTION OF THE PREFERRED EMBODIMENT

According to an embodiment of the present invention, a coordinate input device is constituted by an operation area operated by a coordinate input object, a coordinate data formation section for generating coordinate data representing a coordinate position on the operation area operated by the coordinate input object, and a signal processor for processing the coordinate data to display the coordinate data, and the coordinate data formation section comprises a moving amount detection section for detecting a moving speed of the coordinate input object on the operation area and a filter for removing an unnecessary frequency component included in the coordinate data, so that the cutoff frequency of the filter is switched in accordance with the moving speed detected by the moving amount detection section.

According to the preferred embodiment, the cutoff frequency of the filter is switched to a high cutoff frequency when the moving speed of the coordinate input object is high, and is switched to a low cutoff frequency when the moving speed of the coordinate input object is low.

According to the preferred embodiment, as the filter, a filter having a multi-layer structure is used.

According to the embodiment, the moving amount detection section for detecting the moving speed of the coordinate input object on the operation area and the filter for removing an unnecessary frequency component included in the coordinate data, i.e., a frequency component which causes fine movement or vibration of a cursor are arranged in the coordinate data formation section. When the moving amount detection section detects that the moving speed of the coordinate input object on the operation area is higher than a conventional moving speed, the cutoff frequency of the filter is shifted to a high-frequency side in accordance with the degree of moving speed. On the other hand, when it is detected the moving speed of the coordinate input object on the operation area is lower than the conventional moving speed, the cutoff frequency is shifted to a low-frequency side in accordance with the degree of moving speed.

Since the cutoff frequency of the filter is shifted to a high- or low-frequency side in accordance with the moving speed of the coordinate input object on the operation area as described above, the filter can reduce the frequency component which causes fine movement or vibration of the cursor without attenuating the frequency component representing the moving speed of the coordinate input object.

EMBODIMENT

An embodiment of the present invention will be described below with reference to the accompanying drawings.

Figure 1:
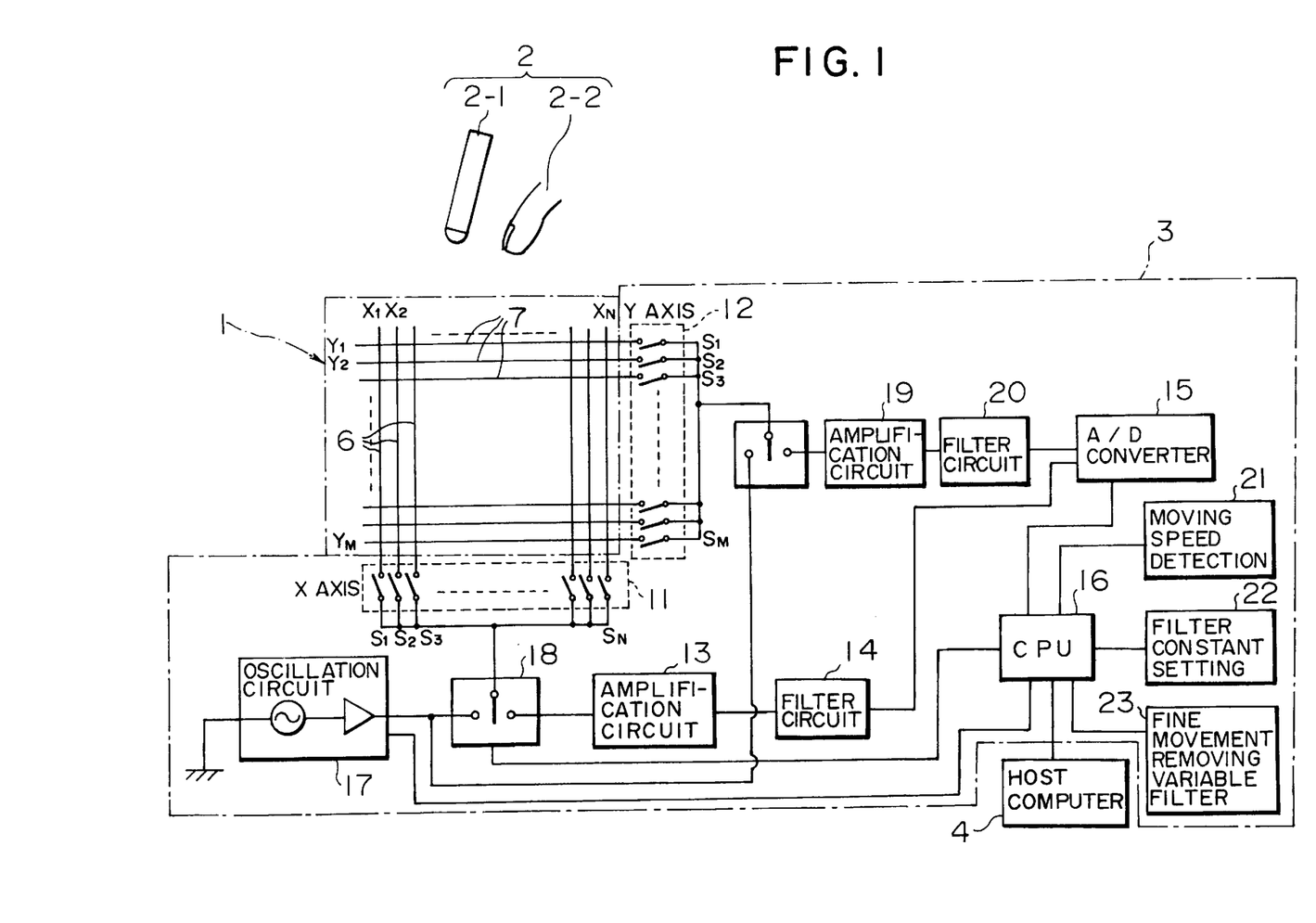
FIG. 1 is a block diagram showing a coordinate input device according to an embodiment of the present invention.
Figure 2:
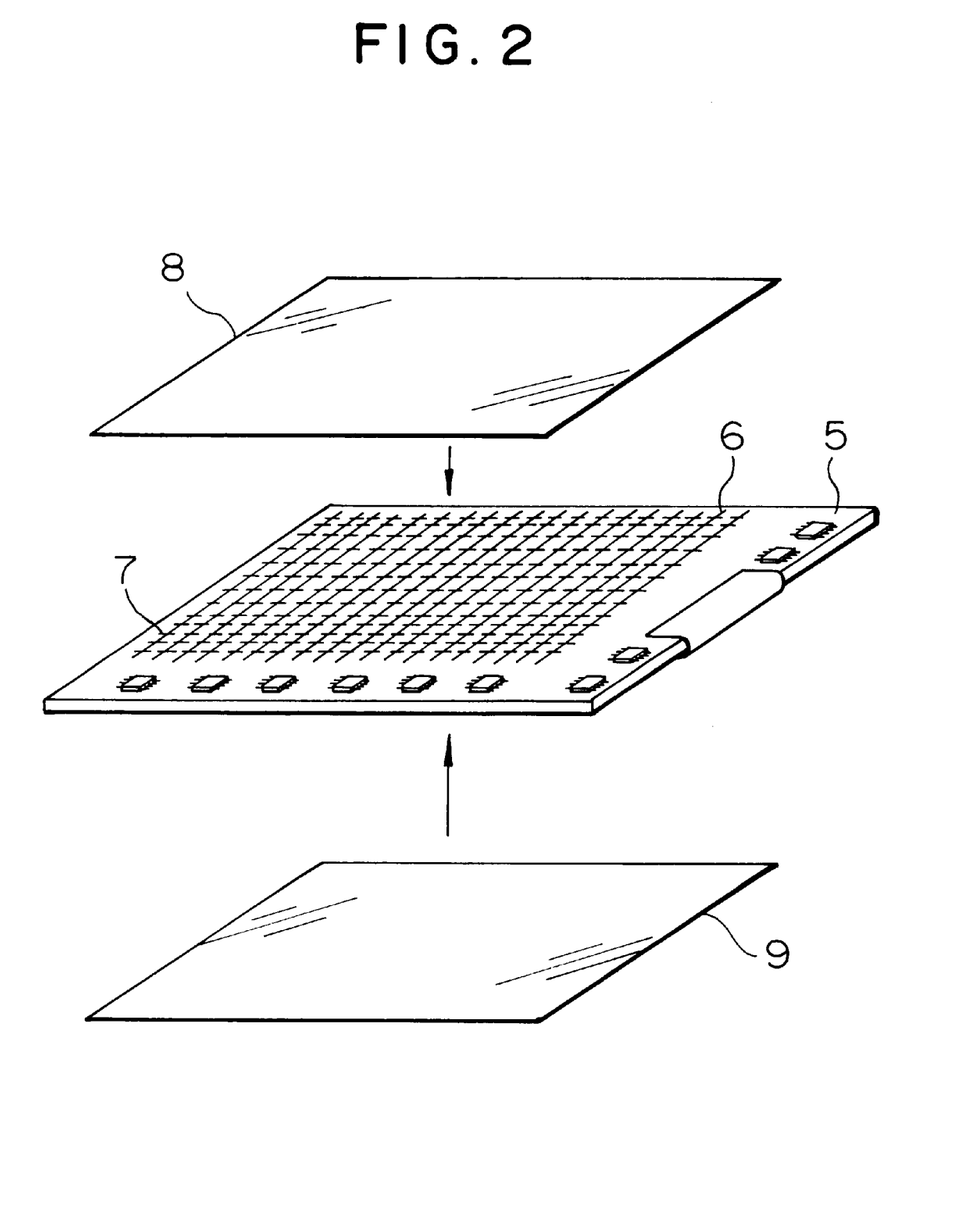
FIG. 2 is a development showing an arrangement of a tablet used in the coordinate input device shown in FIG. 1.

FIG. 1 is a block diagram showing a coordinate input device according to an embodiment of the present invention. FIG. 2 is a development showing an arrangement of a tablet used in the coordinate input device shown in FIG. 1.

As shown in FIG. 1, the coordinate input device is constituted by a tablet (operation area) 1, a coordinate input object 2 such as an input pen 2-1 or a finger 2-2 of an operator, a coordinate data generation section 3, and a signal processor 4 such as a personal computer (PC).

The tablet 1, as shown in FIG. 2, is constituted by a film substrate 5, a plurality of (N) parallel X electrodes 6 ($X_1$ to $X_N$) formed on the upper surface of the film substrate 5, a plurality of (M) parallel Y electrodes 7 ($Y_1$ to $Y_M$) which are adhered to the lower surface of the film substrate 5 and arranged perpendicularly to the X electrodes 6 ($X_1$ to $X_N$), a protective film 8 adhered to the upper surface of the film substrate 5, and a shield film 9 adhered to the lower surface of the film substrate 5. The tablet 1 is incorporated in the keyboard of the personal computer to function as a mouse.

The coordinate data generation section 3, as shown in FIG. 1, is constituted by an X-axis side multiplexer 11 having a plurality of (N) switches $S_1$ to $S_N$ arranged in parallel, a Y-axis side multiplexer 12 having a plurality of (M) switches $S_1$ to $S_M$ arranged in parallel, a first amplification circuit 13, a first filter circuit 14, an analog/digital converter (A/D) 15, a controller (CPU) 16, an oscillation circuit 17, a first drive selection circuit 18 constituted by a switch, a second drive selection circuit 24, a second amplification circuit 19, a second filter circuit 20, a moving speed detection section 21, a filter constant setting section 22, and a fine movement removing variable filter 23. In this case, the moving speed detection section 21 calculates the difference a coordinate position which is previously output and a coordinate position which is currently output on the basis of a digital signal supplied to the CPU 16, and detects the moving speed of the input pen 2 on the tablet 1 on the basis of the difference. The filter constant setting section 22 sets the filter constant value of the fine movement removing variable filter 23 in accordance with the moving speed detected by the moving speed detection section 21. The fine movement removing variable filter 23 adjusts its cutoff frequency on the basis of the filter constant value supplied from the filter constant setting section 22. The moving speed detection section 21 has input and output terminals which are connected to the CPU 16 and the input terminal of the filter constant setting section 22, respectively. The output terminal of the filter constant setting section 22 is connected to the control terminal of the fine movement removing variable filter 23. The input and output terminals of the fine movement removing variable filter 23 are connected to the CPU 16. In this case, all the moving speed detection section 21, the filter constant setting section 22, and the fine movement removing variable filter 23 are not constituted as hardware but as software related to the CPU 16.

An operation of the coordinate input device according to this embodiment with the above arrangement will be described below.

In the coordinate input device according to this embodiment, all the switches $S_1$ to $S_N$ of the X-axis side multiplexer 11 are turned on to scan the X electrodes 6 ($X_1$ to $X_N$) of the tablet 1, and the switches $S_1$ to $S_M$ of the Y-axis side multiplexer 12 are sequentially turned on to scan the Y electrodes 7 ($Y_1$ to $Y_M$) of the tablet 1. All the switches $S_1$ to $S_M$ of the Y-axis side multiplexer 12 are turned on to scan the Y electrodes 7, and the switches Si to $S_N$ of the X-axis side multiplexer 11 are sequentially turned on to scan the X electrodes. A contact portion where the coordinate input object 2 is brought into contact with the tablet 1 is detected, and the detected coordinate position is displayed on the display unit of the signal processor 4.

Here, an operation performed in a case wherein the coordinate input object 2 such as the finger 2-2 is moved while the coordinate input object 2 is in contact with the tablet 1 and the cutoff frequency of the fine movement removing variable filter 23 is changed in accordance with the moving speed will be described below with reference to the graphs shown in FIGS. 3A to 3C and the flow chart shown in FIG. 4.

Figure 3A:
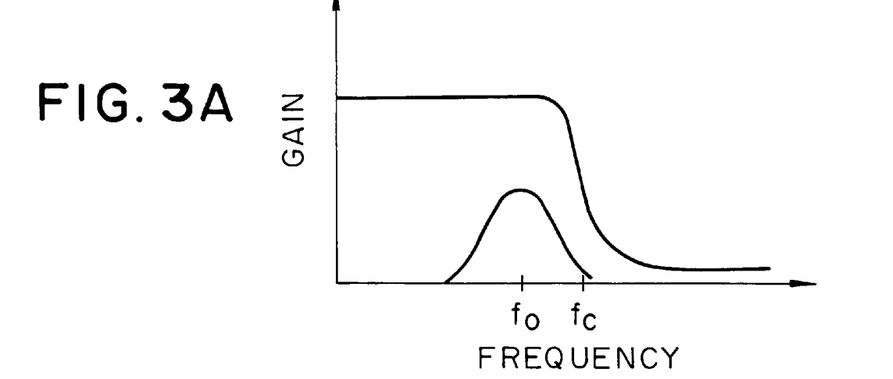
FIGS. 3A to 3C are graphs showing filter characteristics of a fine movement removing filter used in the coordinate input device shown in FIG. 1.
Figure 3B:
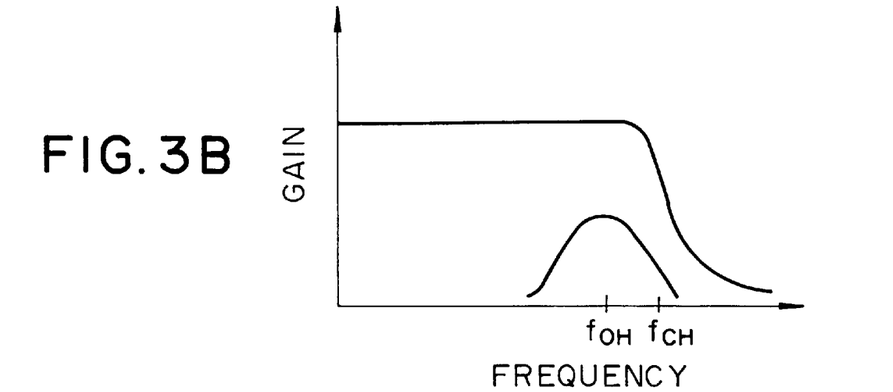
Figure 3C:
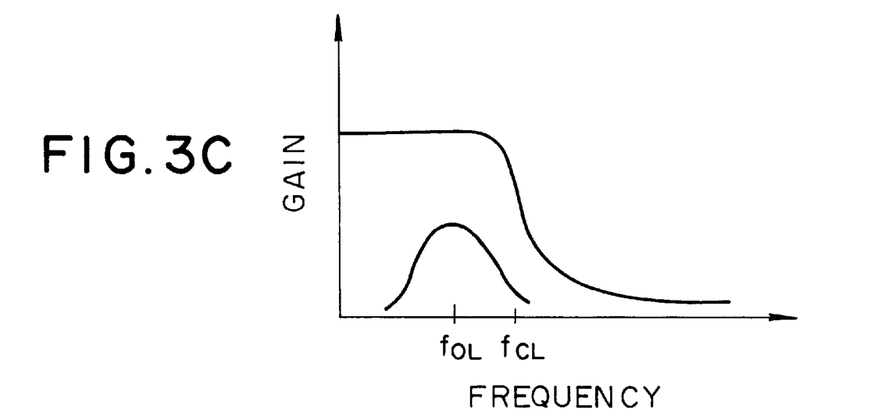
Figure 4:
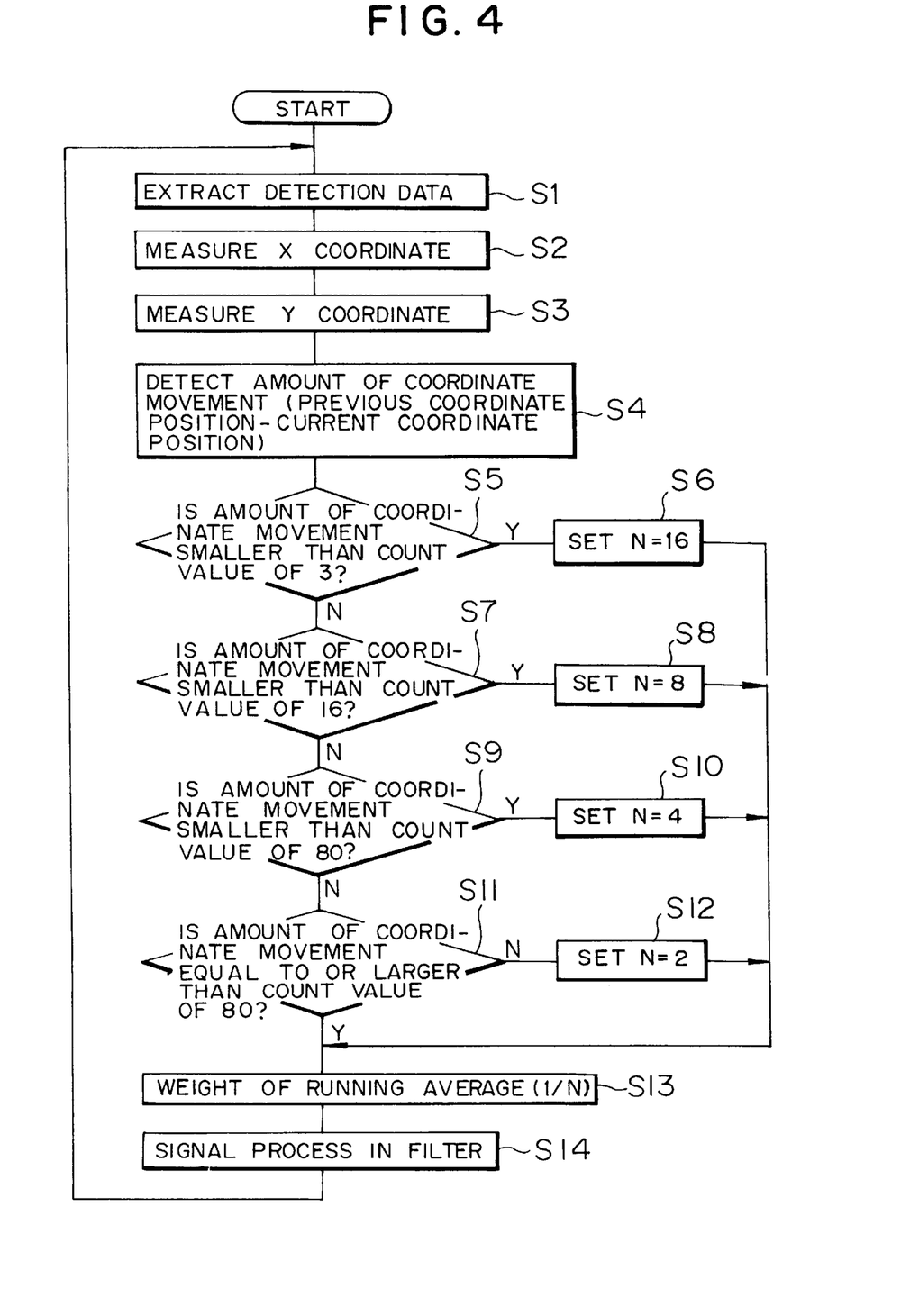
FIG. 4 is a flow chart showing the details of an operation performed when the cutoff frequency of a fine movement removing variable filter is changed in the coordinate input device shown in FIG. 1.

The graphs in FIGS. 3A, 3B, and 3C show the filter characteristics of the fine movement removing filter 23 having a cutoff frequency set in an ordinary state; the filter characteristics of the fine movement removing filter 23 having a cutoff frequency shifted to a frequency higher than the frequency in the ordinary state; and the filter characteristics of the fine movement removing filter 23 having a cutoff frequency shifted to a frequency lower than the frequency in the ordinary state. The flow chart in FIG. 4 shows the details of an operation performed when the cutoff frequency of the fine movement removing variable filter 23 is changed.

In step S1, when the coordinate input object 2 such as the finger 2-2 of the operator is brought into contact with the tablet 1, signal voltages obtained from the Y electrodes 7 ($Y_1$ to $Y_M$) of the tablet 1 are sequentially extracted through the Y-axis side multiplexer 12. The signal voltages are amplified by the first amplification circuit 13, and the noise component of the signal voltages are removed by the first filter circuit 14. The signal voltages are converted into digital signals by the A/D 15. The resultant digital signals are loaded on the CPU 16.

In step S2, the CPU 16 measures the X coordinate of the tablet 1 on the basis of the loaded digital signals.

In step S3, the CPU 16 measures the Y coordinate of the table 1 on the basis of the loaded digital signals.

In step S4, the CPU 16 drives the moving speed detection section 21 to detect the moving amount of the coordinate position by using the difference between the previously measured X-coordinate position and the currently measured X-coordinate position and the difference between the previously measured Y-coordinate position and the currently measured Y-coordinate position on the basis of the loaded digital signal.

Subsequently, in step S5, the CPU 16 checks, on the basis of the detection result of the moving speed detection section 21, whether the moving amount of the coordinate position is smaller than a count value of 3. If it is determined that the moving amount of the coordinate position is smaller than a count value of 3 (Y), the flow shifts to step S6. If it is determined that the moving amount of the coordinate position is not smaller than a count value of 3 (N), the flow shifts to step S7.

Subsequently, in step S6, the CPU 16 controls and drives the filter constant setting section 22 through the moving speed detection section 21. A coefficient N {coefficient representing weight (1/N) of running level (to be described later)} output from the filter constant setting section 22 is set in the CPU 16.

In step S7, the CPU 16 checks, on the basis of the detection result of the moving speed detection section 21, whether the moving amount of the coordinate position is smaller than a count value of 16. If it is determined that the moving amount of the coordinate position is smaller than a count value of 16 (Y), the flow shifts to next step S8. If it is determined that the moving amount of the coordinate position is not smaller than a count value of 16 (N), the flow shifts to other step S9.

In step S8, the CPU 16 controls and drives the filter constant setting section 22 through the moving speed detection section 21, and set a coefficient N output from the filter constant setting section 22 to be 8.

In step S9, the CPU 16 checks, on the basis of the detection result of the moving speed detection section 21, whether the moving amount of the coordinate position is smaller than a count value of 80. If it is determined that the moving amount of the coordinate position is smaller than a count value of 80 (Y), the flow shifts to next step S10. If it is determined that the moving amount of the coordinate position is not smaller than a count value of 80 (N), the flow shifts to other step S1.

Subsequently, in step S11, the CPU 16 controls and drives the filter constant setting section 22 through the moving speed detection section 21, and sets a coefficient N output from the filter constant setting section 22 to be 4.

In step S11, the CPU 16 checks, on the basis of the detection result of the moving speed detection section 21, whether the moving amount of the coordinate position is equal to or larger than a count value of 80. If it is determined that the moving amount of the coordinate position is equal to or larger than a count value of 80 (Y), the flow shifts to next step S12. If it is determined that the moving amount of the coordinate position is not equal to or larger than a count value of 80 (N), the flow shifts to other step S13.

In step S12, the CPU 16 controls and drives the filter constant setting section 22 through the moving speed detection section 21, and sets a coefficient N output from the filter constant setting section 22 to be 2.

Subsequently, in step S13, the weight (1/N) of running average of the fine movement removing variable filter 23 is set on the basis of the coefficient N output from the filter constant setting section 22.

In step S14, the CPU 16 applies the digital signals supplied from the A/D 15 to the fine movement removing variable filter 23 in which the weight (1/N) of the running average is set, and supplies the digital signal passing through the fine movement removing variable filter 23 to the signal processor 4. Upon completion of this process, the flow returns to step S1, the processes in the steps following step S1 are repeated again.

In this case, when the weight (1/N) of the running average of the fine movement removing variable filter 23 is set, a current coordinate data output from the fine movement removing variable filter 23 is expressed by:

previous coordinate data×{(N−1)/N}+current coordinate data×(1/N).

When it is assumed that an update period (sampling period) of the coordinate data is represented by T, the cutoff frequency $f_c$ of the fine movement removing variable filter 23 is given by ($\frac{1}{2}$ $\pi Z$) where Z=T×(1/N).

When the average sampling period, i.e., 10 msec, in the tablet 1 are used as the sampling period T, the relationship between the weight N (1/N) of the running average of the fine movement removing variable filter 23 and the cutoff frequency $f_c$ is considered. In this case, the following results are obtained:

N=4, i.e., (1/N)=(¼), $f_c$=4 Hz;
N=8, i.e., (1/N)=(⅛), $f_c$=2 Hz; and
N=2, i.e., (1/N)=(½), $f_c$=8 Hz.

As is apparent from these results, it is desirable that the weight (1/N) of the running average of the fine movement removing variable filter 23 is changed in accordance with the contact moving speed of the finger 2-2 of the operator on the tablet 1, and, at the same time, the cutoff frequency $f_c$ of the fine movement removing variable filter 23 is changed.

More specifically, assume that the contact moving speed of the finger 2-2 on the tablet 1 is an intermediate moving speed and that the frequency relationship between an intermediate frequency $f_O$ of a frequency component representing the moving speed of the finger 2-2 and the cutoff frequency $f_c$ of the fine movement removing variable filter 23 are set to have the characteristics shown in FIG. 3A. In this case, when the contact moving speed of the finger 2-2 on the tablet 1 is higher than the intermediate moving speed, the frequency relationship between an intermediate frequency $f_{OH}$ of a frequency component representing the moving speed of the finger 2-2 and a cutoff frequency $f_{CH}$ of the fine movement removing variable filter 23 may be shifted, as shown in FIG. 3B, to a high-frequency side by a predetermined frequency while the frequency relationship shown in FIG. 3A is kept. On the other hand, when the contact moving speed of the finger 2-2 on the tablet 1 is lower than the intermediate moving speed, the frequency relationship between an intermediate frequency $f_{OL}$ of a frequency component representing the moving speed of the finger 2-2 and a cutoff frequency $f_{CL}$ of the fine movement removing variable filter 23 may be shifted, as shown in FIG. 3C, to a low-frequency side by a predetermined frequency while the frequency relationship shown in FIG. 3A is kept.

The fine movement removing variable filter 23 is not limited to a variable filter having a single-layer structure. When the frequency component which causes fine movement or vibration of a cursor is to be considerably reduced, the fine movement removing variable filter 23 may have a structure constituted by a plurality of layers, i.e., a multi-layer structure.

As described above, according to this embodiment, since the cutoff frequency $f_c$ of the fine movement removing variable filter 23 is shifted to a high- or low-frequency side in accordance with the contact moving speed of the finger 2-2 on the tablet 1, only the frequency component which causes fine movement or vibration of the cursor displayed on the display unit 10 of the signal processor 4 can be always reduced without attenuating the frequency component representing the contact moving speed of the finger 2-2, and cursor movement being free from fine movement or vibration can be made without decreasing the moving speed of the cursor.

As has been described above, according to the present invention, a moving amount detection section for detecting the moving speed of the coordinate input object on an operation area and a filter for removing an unnecessary frequency component included in coordinate data are arranged in a coordinate data formation section. When the moving amount detection section detects that the moving speed of the coordinate input object on the operation area is higher than an ordinary moving speed, the cutoff frequency of the filter is shifted to a high-frequency side in accordance with the degree of moving speed. On the other hand, when the moving amount detection section detects that the moving speed of the coordinate input object on the operation area is lower than the ordinary moving speed, the cutoff frequency of the filter is shifted to a low-frequency side in accordance with the degree of moving speed. For this reason, in the filter, a frequency component which causes fine movement or vibration of a cursor can be always reduced without attenuating a frequency component representing the moving speed of the coordinate input object, and cursor movement being free from fine movement or vibration can be advantageously made without decreasing the moving speed of the cursor.

What is claimed is:

1. A coordinated input device comprising
an operation area operated by a coordinate input object;
a coordinate data formation section for generating coordinate data representing a coordinate position on said operation area operated by said coordinate input object; and
a signal processor for processing the coordinate data to display the coordinate data, characterized in that said coordinate data formation section comprises a moving amount detection section for detecting a moving speed of said coordinate input object on said operation area and a variable filter for removing an unnecessary frequency component included in the coordinate data, said variable filter using the weight of a running average as a filter constant, the moving speed having a characteristic intermediate frequency;

wherein:

the weight of the running average is set in response to the amount of change in the moving speed, as detected by the moving amount detecting section, such that the frequency component of the moving speed of the coordinate input object is not attenuated;

the cutoff frequency of the variable filter is changed in response to the change in the weight of the running average; and the frequency difference between the cutoff frequency and the characteristic intermediate frequency is constant, the cutoff frequency being higher than the characteristic intermediate frequency.

2. A coordinate input device according to claim 1 characterized in that, as said variable filter, a filter having a multi-layer structure is used.

3. The coordinate input device according to claim 1, wherein the detection of the moving amount of coordinate is calculated in reference to a difference between a previous coordinate position and a present coordinate position, the moving amount being divided into a plurality of stages and the weight of the running average being set for every stage in response to the moving amount.

* * * * *